US008234157B2

(12) United States Patent
Monteverde et al.

(10) Patent No.: US 8,234,157 B2
(45) Date of Patent: Jul. 31, 2012

(54) METHOD FOR INTERNET BASED ADVERTISING AND REFERRAL USING A FIXED FEE METHODOLOGY

(75) Inventors: Dante Monteverde, Barrington Hills, IL (US); Patrick Devereaux, Barrington Hills, IL (US); Arsen Vladimirskiy, Chicago, IL (US); Gemma Piscotti, Chicago, IL (US); Baird Larson, Wilmette, IL (US)

(73) Assignee: Emergency 24, Inc., Chicago, IL (US)

( * ) Notice: Subject to any disclaimer, the term of this patent is extended or adjusted under 35 U.S.C. 154(b) by 1053 days.

(21) Appl. No.: 11/459,519

(22) Filed: Jul. 24, 2006

(65) Prior Publication Data
US 2008/0033796 A1 Feb. 7, 2008

(51) Int. Cl.
*G06Q 30/00* (2012.01)
(52) U.S. Cl. .......................................................... 705/14
(58) Field of Classification Search .................. 705/14, 705/37
See application file for complete search history.

(56) References Cited

U.S. PATENT DOCUMENTS

| 5,724,521 | A  | 3/1998  | Dedrick          |
|-----------|----|---------|------------------|
| 5,740,549 | A  | 4/1998  | Reilly et al.    |
| 5,745,882 | A  | 4/1998  | Bixlar et al.    |
| 5,745,899 | A  | 4/1998  | Burrows          |
| 6,029,195 | A  | 2/2000  | Herz             |
| 6,178,419 | B1 | 1/2001  | Legh-Smith et al.|
| 6,269,361 | B1 | 7/2001  | Davis et al.     |
| 6,285,987 | B1 | 9/2001  | Roth et al.      |
| 6,460,036 | B1 | 10/2002 | Herz             |
| 6,516,311 | B1 | 2/2003  | Yacoby et al.    |
| 6,760,916 | B2 | 7/2004  | Holtz et al.     |
| 6,771,290 | B1 | 8/2004  | Hoyle            |
| 2001/0014868 | A1 | 8/2001 | Herz et al.     |
| 2001/0042064 | A1 | 11/2001 | Davis et al.   |
| 2002/0169760 | A1* | 11/2002 | Cheung et al. ..................... 707/3 |
| 2003/0036944 | A1 | 2/2003 | Lesandrini et al. |
| 2003/0046098 | A1 | 3/2003 | Kim             |
| 2003/0088553 | A1* | 5/2003 | Monteverde ..................... 707/3 |
| 2003/0093285 | A1 | 5/2003 | Colace et al.   |
| 2003/0135460 | A1 | 7/2003 | Talegon         |
| 2003/0167212 | A1* | 9/2003 | Monteverde .................... 705/26 |
| 2003/0195837 | A1* | 10/2003 | Kostic et al. .................... 705/37 |
| 2003/0216930 | A1 | 11/2003 | Dunham et al.  |
| 2003/0220866 | A1 | 11/2003 | Pisaris-Henderson et al. |
| 2004/0044571 | A1 | 3/2004 | Bronnimann et al. |
| 2004/0059708 | A1 | 3/2004 | Dean et al.    |
| 2004/0068436 | A1 | 4/2004 | Boubek et al.  |

(Continued)

*Primary Examiner* — Saba Dagnew
(74) *Attorney, Agent, or Firm* — Seyfarth Shaw LLP

(57) ABSTRACT

A method of advertising a first web site on a second web site comprising with a fixed compensation based methodology. The method includes providing an upper level category and a lower level category, assigning at least one keyword to each of the categories, respectively assigning fixed amounts of compensation to the keywords that the first web sites will pay, assigning the second web site to any one of the categories, thereby defining a second web site category, associating the first web site with any of the keywords and with the amount of compensation assigned to such keywords, thereby defining at least one first web site category, in response to receiving a request from the second web site, determining the second web site category, and providing to the second web site a hyperlink to the first web site. In response to an Internet user selecting any one of the hyperlinks, awarding the second web site at least a portion of the fixed amount of compensation assigned to the keyword that substantially matches the queried keyword and with which the first web site corresponding to the selected hyperlink is associated.

20 Claims, 3 Drawing Sheets

U.S. PATENT DOCUMENTS

| | | |
|---|---|---|
| 2004/0093327 A1 | 5/2004 | Anderson et al. |
| 2004/0133469 A1* | 7/2004 | Chang .............................. 705/14 |
| 2004/0167928 A1 | 8/2004 | Anderson et al. |
| 2005/0149396 A1* | 7/2005 | Horowitz et al. ............... 705/14 |

* cited by examiner

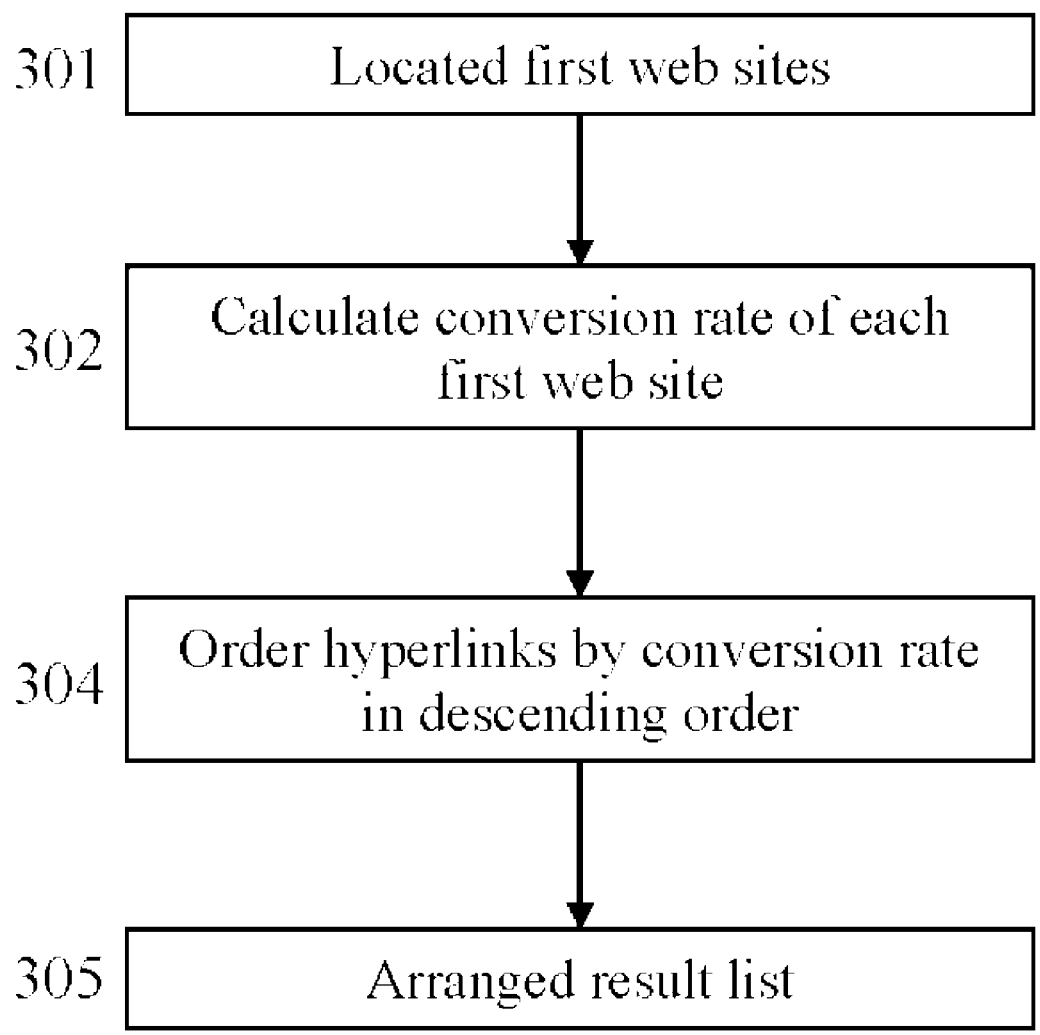

METHOD FOR INTERNET BASED ADVERTISING AND REFERRAL USING A FIXED FEE METHODOLOGY

BACKGROUND OF THE INVENTION

The present invention relates generally to Internet based advertising, and more particularly to Internet based advertising wherein an advertiser pays for advertisement placement on an affiliate's web site and the affiliate's web site receives compensation for placing the advertisement.

Internet related traffic, or visits to a web site by an Internet user, is the main statistic used by an Internet advertiser to determine where to display and how much to pay for its advertisement on another's web site. Typically, the more Internet traffic a web site that is displaying an advertiser's advertisement is receiving, the greater the possibility for the advertiser to have its products or services exposed to potential purchasers. As such, there is an incentive for an advertiser to display its advertisements as immensely as possible in order to reach the broadest potential purchaser base.

A common method of Internet advertising includes charging an advertiser for the exposure of its advertisement to all Internet users regardless if the advertisement resulted in the Internet user actually visiting the advertiser's site by clicking on the advertisement. For example, an advertiser may pay an affiliate site that is willing to display the advertiser's advertisement for the number of times that the advertisement is displayed. While this method of advertising offers a potentially high exposure rate to numerous Internet users, such simplistic exposure to such a large number of Internet users offers little in the form of Internet users generally interested in the advertisement, which would prompt the Internet user to visit the advertiser's Internet site to purchase the advertised product or service. For example, out of 10,000 Internet users that the advertisement was displayed to, if only 10 went to the advertiser's web site to view the advertiser's products or services, the advertiser must still pay for the 10,000 advertisement displays.

It is well known that actual Internet traffic can be used as the main means for determining whether or not compensation should be paid by the advertiser for a referral via an advertisement placed on an affiliate's site, commonly referred to as "Pay Per Click" advertising. With Pay Per Click advertising, the advertiser compensates an affiliate only if an Internet user is actually interested in the advertisement and subsequently visits the advertiser's site by clicking on the advertisement displayed on the affiliate's site. In other words, the advertiser pays the affiliate for displaying the advertisement only if the advertisement is successful in enticing an Internet user to visit the advertiser's Internet site from the affiliate's site.

In conventional Pay Per Click systems, the advertisers bid for keywords, wherein the highest bidding advertiser for a keyword is placed highest in a search results listing. It is also well known that, in order to increase its exposure, advertisers commonly bid for keywords that are irrelevant to the advertiser's offered goods or services. Accordingly, the advertiser that is capable of out-bidding other advertisers for a keyword is listed highest in a search results listing, regardless if such advertiser's goods or services are relevant to the queried keyword. As such, the present bid-placement methods are unjust wherein the advertisers with the greatest amount of capital are typically listed higher in the search results list.

BRIEF SUMMARY OF THE INVENTION

The present application discloses a method for Internet based advertising using a fixed fee methodology, thus avoiding and overcoming the shortcomings of well-known bid-placement methodologies. The present application therefore discloses a method of advertising by displaying hyperlinks to first web sites on a second web site, wherein the first web sites agree to pay a fixed compensation amount that is preset and which is not determined by first web sites bidding against each other, such as in conventional bid-for-placement systems. In an embodiment, the method includes providing upper and lower level categories, wherein keywords are assigned to the categories. The second web site is assigned to any one of the categories based upon a performance of the second web site. In each category, fixed amounts of compensation are respectively assigned to the keywords, and the first web sites are respectively associated with any of the keywords, and with the amount of compensation assigned to such keywords, in accordance with the amount of compensation that the first web site is willing to pay. In an embodiment, the method includes receiving a keyword query having a queried keyword from the second web site, wherein the category that the second web site is assigned is then determined. After determining the second web category assignment, the method includes arranging respective hyperlinks to any of the first web sites associated with the keyword that substantially matches the queried keyword and that is assigned to the second web site category, thereby creating an arranged results list. The arranged results list may then be provided to the second web site for display to an Internet user.

In response to the Internet user selecting any one of the hyperlinks, the second web site may be awarded at least a portion of the fixed amount of compensation assigned to the keyword that substantially matches the queried keyword and with which the first web site corresponding to the selected hyperlink is associated. In response to the Internet user selecting any one of the hyperlinks, the first web site corresponding to the selected hyperlink may be charged the fixed amount of compensation assigned to the keyword that substantially matches the queried keyword and with which the first web site corresponding to the selected hyperlink is associated.

Accordingly, the first web sites pay an amount of compensation that is not determined by a conventional bid-for-placement methodology. Further, the likelihood that any one of the first web sites is returned towards the top of a results list depends upon the first web sites' respective performances and ability to entice Internet users to their respective web site, with accurate descriptions and/or titles conveyed with the hyperlink.

BRIEF DESCRIPTION OF THE DRAWINGS

For the purpose of facilitating an understanding of the subject matter sought to be protected, there is illustrated in the accompanying drawings embodiments thereof, from an inspection of which, when considered in connection with the following description, the subject matter sought to be protected, its construction and operation, and many of its advantages, should be readily understood and appreciated.

FIG. 3 is a flow chart of an embodiment of the present invention depicting a preferred method of creating an Arranged Results List.

DETAILED DESCRIPTION

The present application discloses a method of advertising a first web site on a second web site using a fixed-fee based methodology. In an embodiment, the first web site may be an advertiser's web site having an advertisement and the second web site may be an advertiser affiliate's web site that places an advertisement for the advertiser's web site on the affiliate's web site for a fee. The advertisement may include a hyperlink to the advertiser's site and a title and/or description of the advertiser's products or services. In another embodiment, the second web site may be a web site distributor, such as, for example, an Internet search engine, a web site directory service, a software application, a browser tool, a web content tool or toolbar, a stand-alone database, or any other distribution or application capable of creating a request for a hyperlink to any one of the first web sites. In an embodiment, a plurality of first web sites may be advertised on any one of a plurality of second web sites.

Figure 1:
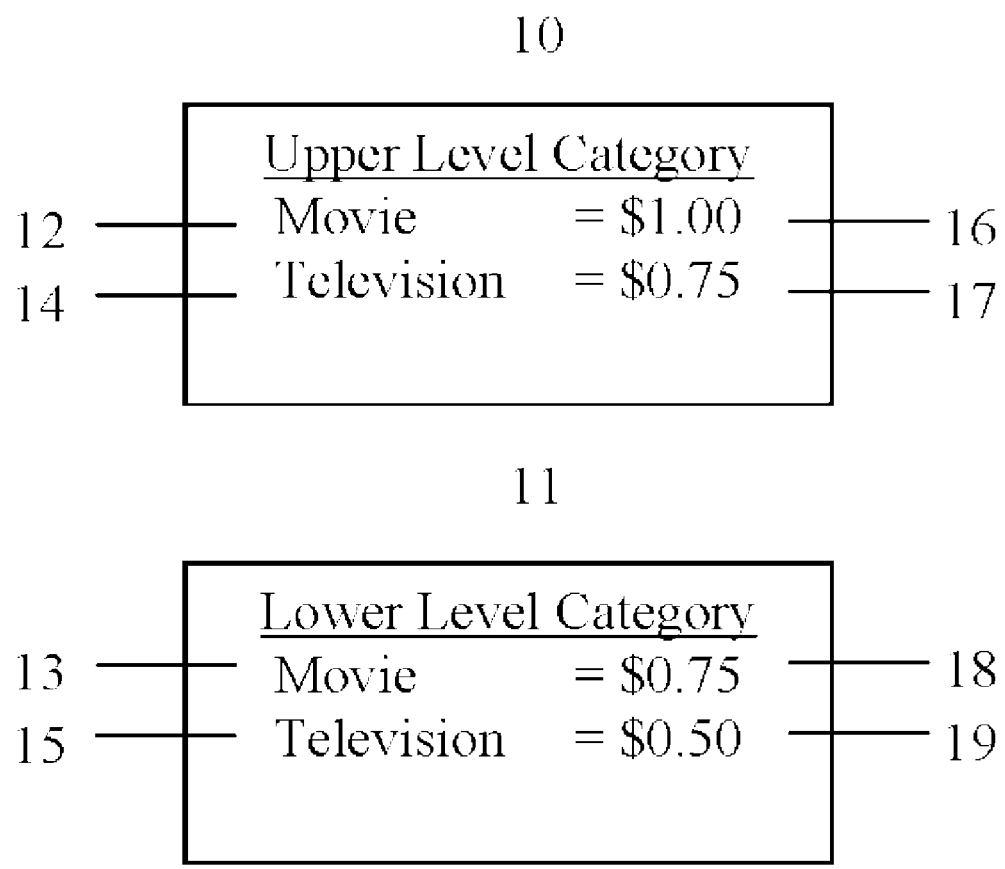
FIG. 1 is schematic diagram of an embodiment of the present invention.

Referring to FIG. 1, in an embodiment, the method of the present application provides at least two level-based categories, one level being a level higher than the other. For example, an upper level category 10 and a lower level category 11 may be provided. It will be appreciated that any number of level-based categories may be provided.

At least one keyword is assigned to each of the categories. The keywords may include a word or phrase typically used for an Internet-based search or query.

After the keywords are assigned to the categories, fixed amounts of compensation are respectively assigned to the keywords. In an embodiment, any one of the keywords assigned to the upper level category has a fixed amount of compensation that is greater than the fixed amount of compensation assigned to the same keyword assigned to the lower level category. Accordingly, and for exemplification purposes only, the keyword "movie" 12 may be assigned to the upper level category 10 and may be assigned a fixed amount of compensation 16 of $1.00 wherein the keyword "movie" 13 assigned to the lower level category 11 may be assigned a fixed amount of compensation 18 of $0.75. Further, any one keyword assigned to any one category may have an assigned amount of compensation that is different than the amount of compensation assigned to another keyword that is also assigned to the same category. For example, the keyword "movie" 12 may be assigned to the upper level category 10 and may be assigned a fixed amount of compensation 16 of $1.00 wherein the keyword "television" 14 may also be assigned to the upper level category 10 and it may be assigned a fixed amount of compensation 17 of $0.75. It will be appreciated that the respective fixed amounts of compensation assigned to the keywords may be determined by a number of factors, such as, for example, the popularity of the keyword, the breadth of the keyword, and the likelihood that the keyword will result in a selected hyperlink of any one of the first web sites. The fixed amounts of compensation represent the amount of compensation that the first web site will pay and the amount of compensation, or a portion thereof, that the second web site may receive, as described in more detail below.

A second web site that desires to advertise a first web site, by, for example, displaying the first web site's advertisement in the form of a hyperlink, is assigned to any one of the categories, thereby defining a second web site category. In an embodiment, the second web site is assigned to any one of the categories based upon a performance of the second web site. In an embodiment, the performance of the second web site is based on one or more criteria selected from the group consisting essentially of keyword conversion rates, first web site satisfaction rates, market penetration, market competitiveness, keyword click-thru rates, and keyword query type. Keyword conversion rates may be based upon a keyword and may include, for example, the number of conversions that occur, such as the number of times an Internet user makes a purchase after selecting a hyperlink associated with each keyword. First web site satisfaction rates may include, for example, general satisfaction surveys submitted or completed by any of the first web sites regarding the first web site's general satisfaction with advertising on the second web site. Market penetration may include, for example, the general popularity of the second web site amongst Internet users. Market competitiveness may include, for example, the ability of the second web site to attract viable Internet users to the second web site compared to other second web sites. Keyword click-thru rates may be based upon, for example, a hyperlink associated with a keyword and displayed on the second web site and may include the number of times that the hyperlink is selected by an Internet user. Keyword query type may include, for example, the type of keyword query or request submitted by the second web site, such as, for example, a query input box wherein an Internet user must manually enter a desired keyword query or an automated keyword query submission by the second web site. It will be appreciated that the criteria set forth above is not exclusive or exhaustive and any one or more may be considered or be given more relevance relative to any of the others.

After the second web site has been assigned to any one of the categories, the performance of the second web site is continually evaluated and assessed, wherein the second web site's category assignment may change if, for example, the performance of the second web site changes. Accordingly, and as set out in more detail below, it will be appreciated that there is an incentive for the second web site to ensure that its performance is as high as possible in order to receive the greatest amount of compensation for displaying a hyperlink to any of the first web sites, wherein the second web site will therefore continually attempt to entice viable Internet users to visit and utilize the second web site as well as employ viable quality control measures to maximize query results' accuracy and completeness.

First web sites that desire to advertise on second web sites are respectively associated with any of the keywords assigned to the categories and with the amount of compensation assigned to such keywords, thereby defining respective first web site categories. Accordingly, each first web site is associated with at least one keyword, in accordance with the amount of compensation that the first web site is willing to pay in response to an Internet user selecting the first web site hyperlink that is displayed on the second web site. For example, a first web site may be associated with the keyword "movie" 12 assigned to the upper level category 10, and the first web site is then associated with the compensation amount 16 of $1.00 assigned to the keyword "movie" 12. Alternatively, if, for example, a first web site does not want to pay the higher amount of compensation for the keyword "movie" 12 in the upper level category, the first web site may be associated with the keyword "movie" 13 assigned to the lower level category 11, and the first web site is then associated with the compensation amount 18 of $0.75 assigned to the keyword "movie" 13. However, because the upper level category 10 has second web sites with higher performances compared to the second web sites assigned to the lower level category 11, thus demanding higher amounts of compensation, as discussed above, the first web site trades-off the higher performance second web sites by being associated with a lower amount of compensation, wherein its hyperlink and/or advertisement will be displayed on second web sites with performances not as high as those assigned to the upper level category. As such, each first web site has control over the quality of second web sites its hyperlink and/or advertisement is displayed on and the amount of compensation that it will pay, and such amount of compensation is fixed, in accordance with the keyword and the category that the associated keyword is assigned to, and it is therefore not dependent upon any competitive bidding process between any of the first web sites.

It will be appreciated that each first web site may be associated with one or more keywords, either within the same category or within different categories. For example, a first web site may be associated with the keyword "movie" 12 within the upper level category 10, wherein the first web site is also associated with the fixed amount of compensation 16 of $1.00 assigned to the keyword "movie" 12 within the upper level category 10, and the first web site may also be associated with the keyword "television" 15 within the lower level category 11, wherein the first web site is also associated with the fixed amount of compensation 19 of $0.50 assigned to the keyword "television" 15 in the lower level category 11.

Figure 2:
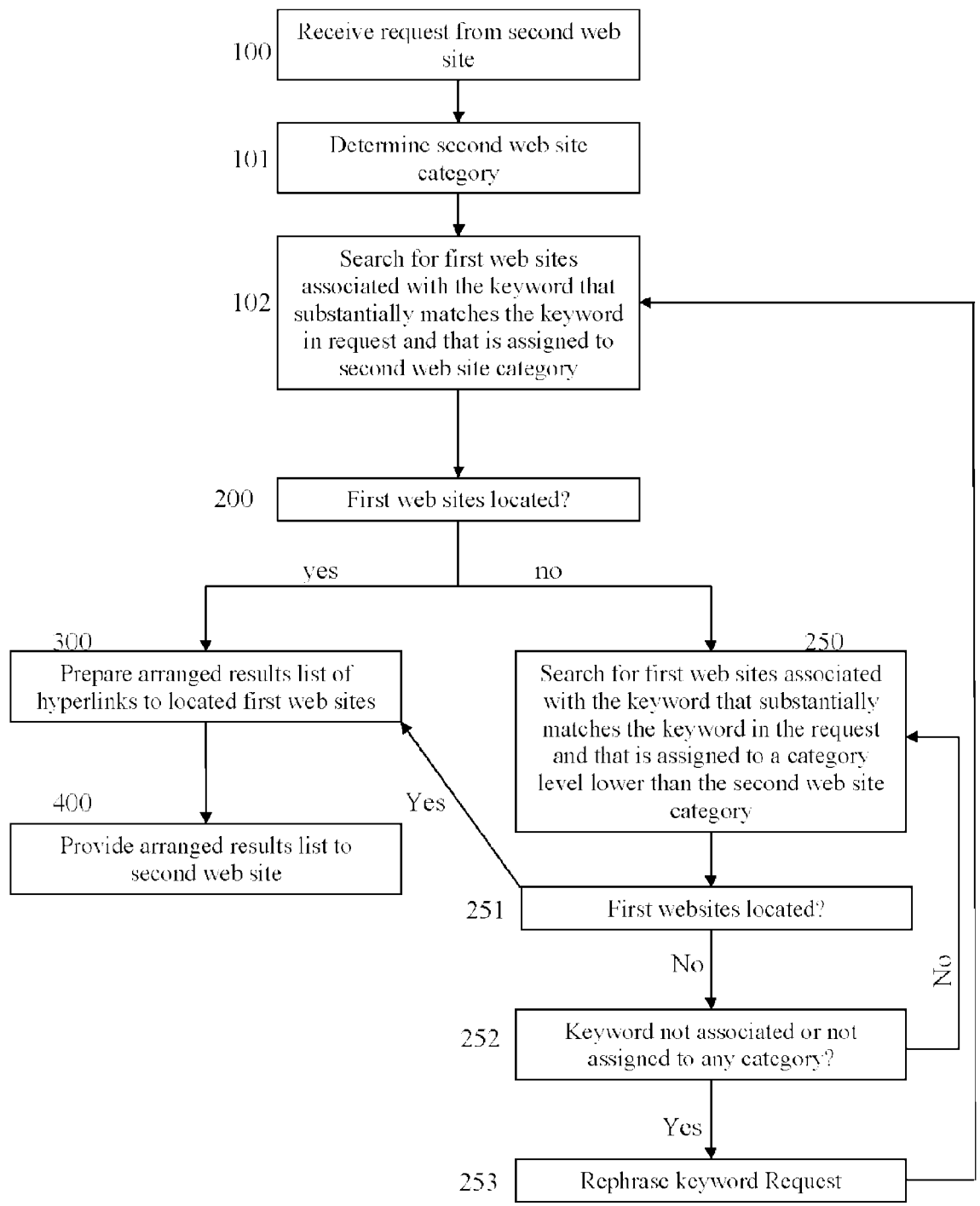
FIG. 2 is a flow chart of an embodiment of the present invention depicting a preferred method of locating First Web Sites.

Referring also to FIG. 2, in response to receiving a request from a second web site 100, the category that the second web site, also known as the second web site category, is determined 101. In an embodiment, the second web site category is determined with an identification located in a well-known http referral string. In another embodiment, any type of identification coding unique to each second web site, for purposes of identifying the second web site, may be used. In an embodiment, the request may include a keyword query having a queried keyword or phrase. In an embodiment, the keyword query may be initiated by an Internet user submitting a desired keyword or phrase in an input box in a well-known manner, such as in a conventional search engine. In another embodiment, the keyword query may be automated in response to an Internet user accessing the second web site, such as, for example, by using the system and method disclosed in U.S. patent application Ser. No. 09/624,107, or U.S. patent application Ser. No. 10/249,895, both of which are incorporated herein by reference.

After receiving the request from the second web site, and after the second web site category is determined, an advertisement for and/or a hyperlink to any of the first web sites is provided to the second web site for display on the second web site. In an embodiment, a hyperlink to the first web site is provided to the second web site if the keyword that the first web site is associated with is also assigned to the category that the second web site is assigned to, also known as the first web site category, matches the second web site category. In another embodiment, a hyperlink to the first web site is provided to the second web site if the first web site category matches the second web site category and the first web site is associated with the keyword that substantially matches the queried keyword 102. In yet another embodiment, if the second web site is assigned to the lower level category, the hyperlink to the first web site may be provided to the second web site if the keyword associated with the first web site substantially matches the queried keyword and the associated keyword is assigned to the upper level category. In such an embodiment, for example, if the queried keyword received from the second web site, which has been assigned to the lower level category 11, is "movie" 13 and the first web site is associated with the keyword "movie" 12 that has been assigned to the upper level category 10, a hyperlink to the first web site may be provided to the second web site because the first web site has been associated with such keyword that has been assigned to the upper level category, thus providing an extra benefit to those first web sites that decided to be associated with keywords assigned to the upper level category. Accordingly, first web sites associated with keywords assigned to the upper level categories may have hyperlinks provided to second web sites assigned to the lower level category if the associated keyword assigned to the upper level category substantially matches the queried keyword.

In an embodiment, if the second web site is assigned to the upper level category and the upper level category does not have an assigned keyword that substantially matches the queried keyword, then the hyperlink to the first web site that is associated with the keyword that substantially matches the queried keyword and that is assigned to the lower level category, may be provided 250. If there is no keyword that substantially matches the queried keyword assigned to any category or if the assigned keyword that substantially matches the queried keyword is not associated with any first web site, then the queried keyword may be rephrased 253 and the hyperlink to the first web site that is associated with the keyword that most closely matches the queried keyword and that is assigned to the second web site category may be provided. For example, if the queried keyword is "movie" and the keyword "movie" is not associated with any first web site, then the hyperlink to the first web site that is associated with the keyword "television" may be provided.

In an embodiment, a plurality of first web sites may be associated with the keyword that substantially matches the queried keyword. In such embodiment, the method includes arranging respective hyperlinks to any of the first web sites, thereby creating an arranged results list 300. In an embodiment, any of the hyperlinks may include respective titles and/or descriptions for the first web sites, which may be authored or provided by the respective first web sites. The arranged results list is then provided to the second web site 400.

Referring also to FIG. 3, in an embodiment, the respective hyperlinks in the arranged results list 300 are arranged based upon respective performances of the first web sites. Quantification of the respective performances of the located first web sites 301, which are those first web sites that should be listed in a results list, may include respective calculated conversion rates for the first web sites 302. In an embodiment, the higher the conversation rate, in comparison to the other first web sites in the arranged results list, the higher the placement of the first web site's hyperlink in the arranged results list. In an embodiment, only first web sites that have a conversion rate above a preset amount, and that are associated with the keyword that substantially matches the queried keyword, will be listed in an arranged results list. The conversion rate may be based, for example, upon the number of conversions that a first web site has had. For example, a conversion may occur if an Internet user selects a first web site's hyperlink and then consummates a transaction, such as a purchase, requests information or the like. Accordingly, the calculated conversion rate takes into consideration if the first web site is the type of web site that is relevant to the queried keyword, derived from the fact that the Internet user was content with the web site's offerings as evidenced from the consummation of a transaction. It will be appreciated that many other types of criteria, either together or alone, may be used to quantify the performance of the first web sites, such as, for example, click-through ratios, survey results, and expert relevance scoring. It will be appreciated that the criteria set forth above is not exclusive or exhaustive and any one or more may be considered or be given more relevance relative to any of the others.

As such, there is an incentive for the first web site to be associated only with keywords that are relevant to the goods or services promoted by the first web site in order to increase the first web site's conversion rate, which will increase the likelihood that such first web site's hyperlink will be listed higher in an arranged results list in the future. If, for example, the first web site is associated with a keyword that is not relevant to the first web site's goods or services, and if the associated keyword substantially matches the keyword in a keyword request wherein such first web site's hyperlink is displayed to an Internet user, and if the Internet user selects such hyperlink, the Internet use will be transferred to the first web site, but since the first web site is not relevant to the queried keyword, the Internet user will likely not consummate any transaction to substantiate a conversion for the calculated conversion rate of the first web site. Accordingly, the conversion rate of that first web site will decrease, wherein its placement in future arranged results lists for a queried keyword that substantially matches the associated keyword that did not result in a conversion transaction will be lower, eventually leading to such first web site's hyperlink not being listed in future arranged results lists for that associated keyword because its conversion rate for such keyword will be too low. Accordingly, there is an incentive for the first web sites to be associated only with relevant keywords and to provide accurate descriptions and/or titles, within the hyperlinks, regarding their respective products or services.

It will be appreciated that not all first web sites will be able to consummate the same transactions that result in a conversion. For example, a first web site may be in the business wherein the consummation of transactions are easier than the consummation of transactions at another first web site. For example, if a plurality of first web sites relate to mortgage brokers, a first mortgage broker's web site may only be able to elicit requests for more information from Internet users, while a second mortgage broker's web site may be able to accept mortgage applications from Internet users. It will be appreciated that the requests for information will likely be consummated more often than actual mortgage applications. In an embodiment, the first web sites' respective conversion rates are weighted, wherein a conversion transaction that is less likely to occur but which is a higher level of a transaction, such as, for example, accepting a mortgage application, is assigned a weighted conversion rate which is higher than a conversion transaction that is more likely to occur. For example, if the first mortgage web site receives a request for information, a weighted conversion rate of 10 may be assigned, wherein if the second mortgage web site receives a completed mortgage application, a weighted conversion rate of 50 may be assigned, therefore taking into consideration the level of consummated transactions that constitute a conversion. As such, because requests for information are easier to solicit than actual mortgage applications, the first mortgage web site will need to consummate five requests for information transactions to equal the one transaction of receiving an actual mortgage application by the second mortgage web site.

In an embodiment, the respective weighted conversion rates of the first web sites associated with the keyword that substantially matches the queried keyword may be multiplied by a random number to better differentiate the weighted conversion rates. The hyperlinks to the first web sites are then arranged in the results list, preferably in declining order wherein the first web site with the highest weighted conversion rate is listed first. Accordingly, it will be appreciated that the first web site listed highest in the arranged results list will have consummated more transactions from other Internet users, thus leading to the presumption that the description and/or title in the hyperlink for such first web site for the associated keyword is accurate and is, therefore, the type of web site that the Internet user is interested in.

In an embodiment, any one or more of the hyperlinks for the first web sites associated with the keyword that substantially matches the queried keyword and that is assigned to the second web site category, may be randomly inserted higher in the arranged results lists, regardless of the corresponding first web site's conversion rate. This provides, for example, opportunities for first web sites that have recently been associated with keywords or first web sites that have modified the respective titles and/or descriptions in the hyperlinks, to increase their respective conversion rates in order to be listed higher in the arranged results lists in the future.

In an embodiment, in response to an Internet user selecting any one of the hyperlinks provided to the second web site, the second web site is awarded at least a portion of the fixed amount of compensation assigned to the keyword that substantially matches the queried keyword and with which the first web site corresponding to the selected hyperlink is associated, but no greater than the fixed amount of compensation assigned to the keyword that substantially matches the queried keyword and that is assigned to the second web site category. For example, if the second web site is assigned to the upper level category 10 and if the first web site is associated with the keyword "movie" 12 which has been assigned to the upper level category 10 and an amount of compensation 16 of $1.00, wherein the $1.00 amount of compensation is also associated with the first web site, if the hyperlink to the first web site provided to the second web site is selected by an Internet user, the second web site is awarded at least a portion of the $1.00 compensation amount. If, for example, the second web site is assigned to the lower level category 11 and if the first web site is associated with the keyword "movie" 12 in the upper level category 10, and if the first web site's hyperlink provided to such second web site is selected by an Internet user, the second web site is awarded at least a portion of the amount of compensation of $0.75, which is the amount of compensation assigned to the keyword "movie" 13 assigned to the second web site category, which is the lower level category 11. Accordingly, the second web site will not be awarded an amount of compensation that is higher than the amount of compensation assigned to the keyword that is assigned to the second web site category and that substantially matches the queried keyword.

In an embodiment, in response to an Internet user selecting any one of the hyperlinks, the first web site corresponding to the selected hyperlink is charged the fixed amount of compensation assigned to the keyword that substantially matches the queried keyword and with which the first web site is associated, but no greater than the fixed amount of compensation assigned to the keyword that substantially matches the queried keyword and that is assigned to the second web site category. For example, if the second web site is assigned for the upper level category 10 and the first web site is associated with the keyword "movie" 12 which has been assigned to the upper level category 10 and an amount of compensation 16 of $1.00, and if the hyperlink to the first web site that is provided to the second web site is selected by an Internet user, the first web site is charged the $1.00 compensation amount. If, for example, the second web site is assigned to the lower level category 11 and if the first web site is associated with the keyword "movie" 12 assigned to the upper level category 10, and if the first web site's hyperlink provided to such second is selected by an Internet user, the first web site is charged the amount of compensation of $0.75, which is the amount of compensation assigned to the keyword "move" 13 assigned to the second web site category, which is the lower level category 11. Accordingly, the first web site will not be charged an amount of compensation that is higher than the amount of compensation assigned to the keyword that is assigned to the second web site category and that substantially matches the queried keyword.

In an embodiment, any of the first web sites associated with the keyword that substantially matches the queried keyword and that is assigned to the upper level category, may be arranged in a second arranged results list. The second arranged results list may also be provided to the second web site. In such embodiment, if such first web site's hyperlink is selected by an Internet user and the second web site is assigned to the lower level category, the second web site is awarded an amount of compensation no greater than the amount of compensation assigned to the keyword that substantially matches the keyword assigned to the lower level category. For example, if a first web site is associated with the keyword "movie" 12 having an assigned amount of compensation 16 of $1.00 in the upper level category 10, and the second web site is assigned to the lower level category 11 and the keyword "movie" 13 assigned to the lower level category 11 is assigned an amount of compensation 18 of $0.75, the second web site is awarded no greater than $0.75, even though the first web site is associated with the keyword, and the amount of compensation for such keyword, assigned to the upper level category. Further, the hyperlinks provided in the second arranged results list may be arranged, relative to the hyperlinks in the arranged results list, with lower weighted conversion rates, therefore giving first web sites associated with the keyword assigned to the second web site category a higher weighted conversion rate and a higher listing than first web sites associated with the keyword assigned to the upper level category. Further, if the first web site corresponding to the selected hyperlink provided to a second web site, that is assigned to a lower level category, is associated with the keyword that substantially matches the queried keyword and that is assigned to the upper level category, such first web site is charged only the amount of compensation assigned to the keyword that substantially matches the queried keyword and that is assigned to the lower level category.

It will be therefore be appreciated that the present application discloses a method of advertising first web sites on second web sites without any conventional competitive bid-for-placement methodology. Therefore, there is an incentive for the second web sites to be assigned to the highest possible category in order to receive the greatest amount of compensation. This is achieved if the performance of the second web site is high, relative to other second web sites. There is also an incentive for the first web sites to accurately provide descriptions and/or titles with their respective hyperlinks in order to receive the higher number of conversions, which increases the conversion rating of the first web site for higher placement of the first web site's hyperlink in subsequent arranged results lists. Accordingly, it will be appreciated that the first web site's placement in an arranged results list is not dependent upon the relative bidding ability of the first web site, but is rather dependent upon the performance of the first web site in relation to the associated keyword.

The matter set forth in the foregoing description and accompanying drawings and examples is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A computer-implemented method of Internet based advertising wherein a first website is advertised on a second website, the method comprising:

providing an upper level category and a lower level category;

assigning a keyword to each of the upper and lower level categories;

respectively assigning fixed amounts of compensation to the keywords, thereby defining an upper level fixed amount of compensation and a lower level fixed amount of compensation;

analyzing a performance level of the second website;

associating the second website with either of the upper and lower level categories based on the performance level of the second website, thereby defining a second website level category, the second website being associated with the lower level category when the performance level of the second website is lower than a performance level threshold;

associating the first website with the keyword, thereby defining a first website keyword;

in response to the second website requesting hyperlinks to websites associated with the keyword, providing to the second website a hyperlink to the first website; and in response to a user selecting the hyperlink, compensating the second website at least a portion of either of the upper level fixed amount of compensation or the lower level fixed amount of compensation based on the second website level category.

2. The method as claimed in claim 1, further comprising associating the first website with either of the upper and lower level categories, thereby defining a first website level category.

3. The method as claimed in claim 1, wherein the performance level of the second website is based on at least one criterion selected from the group consisting of a keyword conversion rate, a first website satisfaction value, a market penetration value, a market competitiveness value, a keyword click-thru rate, and a keyword query type.

4. The method as claimed in claim 1, wherein the step of assigning fixed amounts of compensation to the keywords includes assigning a first amount of compensation to the keyword assigned to the upper level category and a second amount of compensation to the keyword assigned to the lower level category, wherein the first amount of compensation is greater than the second amount of compensation.

5. The method as claimed in claim 1, wherein the step of in response to the second website requesting hyperlinks to websites associated with the keyword, providing to the second website a hyperlink to the first website, includes the second website sending a keyword query having a queried keyword.

6. The method as claimed in claim 5, further comprising associating the first website with either of the upper and lower level categories, thereby defining a first website level category.

7. The method as claimed in claim 6, wherein the step of in response to the second website requesting hyperlinks to websites associated with the keyword, providing to the second website a hyperlink to the first website, includes providing the hyperlink to the first web site only if the first website level category matches the second website level category.

8. A computer-implemented method of Internet based advertising wherein a first website is advertised on a second website, the method comprising:
 providing an upper level category and a lower level category;
 respectively assigning first and second keywords to the upper and lower level categories;
 respectively assigning fixed amounts of compensation to the first and second keywords, thereby defining an upper level fixed amount of compensation and a lower level fixed amount of compensation
 analyzing a performance level of the second website;
 associating the second website with either of the upper and lower level categories based on the performance level of the second website, thereby defining a second website level category, the second website being associated with the lower level category when the performance level of the second website is lower than a performance level threshold;
 associating the first website with the first and second keywords; and
 in response to the second website requesting hyperlinks to websites associated with either of the first and second keywords, providing to the second website a hyperlink to the first website.

9. The method as claimed in claim 8, wherein the performance level of the second website is based on at least one criterion selected from the group consisting of a keyword conversion rate, a first website satisfaction value, a market penetration value, a market competitiveness value, a keyword click-thru rate and a keyword query type.

10. The method as claimed in claim 8, further comprising arranging the hyperlink in an arranged results list among a plurality of hyperlinks based upon a performance level of the first website.

11. The method as claimed in claim 10, wherein the performance level of each of the plurality of first web sites includes a respective conversion rate for each of the plurality of first web sites.

12. The method as claimed in claim 8 wherein the hyperlink includes a description of the first website.

13. The method as claimed in claim 8 further comprising, in response to a user selecting the hyperlink, compensating the second website at least a portion of either of the upper level fixed amount of compensation or the lower level fixed amount of compensation based on the second website level category.

14. The method as claimed in claim 8 further comprising, in response to the second website requesting hyperlinks to websites associated with either of the first and second keywords, providing to the second website a hyperlink to the first website, and in response to a user selecting the hyperlink to the first website, charging the first website an amount corresponding to the fixed amount of compensation assigned to the keyword requested by the second website.

15. A computer-implemented method of Internet based advertising wherein a plurality of first websites are advertised on a second website, the method comprising:
 providing an upper level category and a lower level category;
 respectively assigning a keyword to each of the upper level and lower level categories;
 respectively assigning fixed amounts of compensation to the keywords, thereby defining an upper level fixed amount of compensation and a lower level fixed amount of compensation;
 analyzing a performance level of the second website;
 associating the second website with either of the upper and lower level categories based on the performance level of the second website, thereby defining a second website level category, the second website being associated with the lower level category when the performance level of the second website is lower than a performance level threshold;
 associating the plurality of first websites with the keyword, thereby defining a first website keyword;
 determining the performance level of each of the first websites; and
 in response to the second website requesting hyperlinks to websites associated with the keyword, providing to the second website respective hyperlinks to the first websites associated with the keyword in an order based on the performance level of the first websites to thereby create an arranged results list.

16. A computer-implemented method of Internet based advertising wherein a first website is advertised on a second website, the method comprising:
 providing an upper level category and a lower level category;
 respectively assigning a keyword to each of the upper and lower level categories, thereby defining a keyword level category;
 respectively assigning fixed amounts of compensation to the keywords, thereby defining an upper level fixed amount of compensation and a lower level fixed amount of compensation;
 analyzing a performance level of the second website;
 associating the second website with either of the upper and lower level categories based on the performance level of the second website, thereby defining a second website level category;
 associating the first website with the keyword and the keyword level category, thereby defining a first website level category; and
 in response to the second website requesting hyperlinks to websites associated with the keyword, providing to the second website a hyperlink to the first website only if the first website level category substantially matches the second website level category.

17. The method as claimed in claim 16 further comprising, in response to a user selecting the hyperlink to the first website, charging the first website the fixed amount of compensation assigned to the keyword that substantially matches the keyword.

18. The method as claimed in claim 2, wherein the step of providing to the second website the hyperlink to the first website includes providing the hyperlink to the second website only if the first website level category matches the second website level category.

19. The method as claimed in claim 6, wherein the step of providing to the second website the hyperlink to the first website includes providing the hyperlink only if the first website level category matches the second website level category and the first website keyword substantially matches the queried keyword.

20. The method as claimed in claim 16, where in the step of associating the second website with either of the upper and lower level categories based on the performance level of the second website, thereby defining a second website level category, includes the second website being assigned to the lower level category when the performance level of the second website is lower than a performance level threshold.

* * * * *